Patented Mar. 19, 1929.

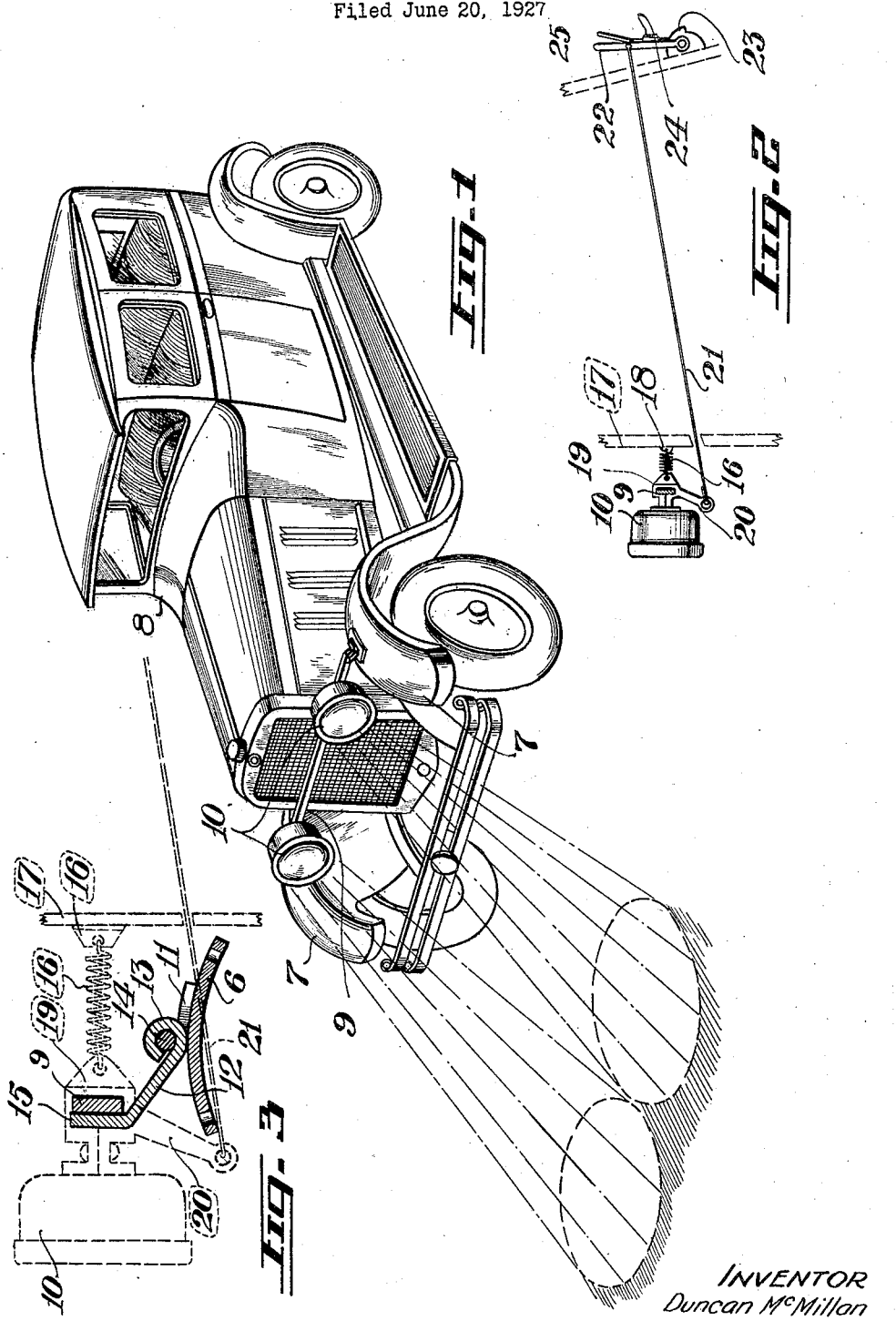

1,705,624

UNITED STATES PATENT OFFICE.

DUNCAN McMILLAN, OF GIBBS, SASKATCHEWAN, CANADA.

TILTING HEADLIGHT.

Application filed June 20, 1927. Serial No. 200,116.

The present invention relates to certain new and useful improvements in tilting headlights for motor vehicles and the like, and has for its primary object the provision of a simple and inexpensive mounting, which permits easy tilting of the headlights, in unison, by operation of a controlling means in ready reach of the operator.

The invention has for another object the provision of tilting headlights for motor vehicles and the like whereby the headlights may be readily tilted by the operator, as desired, to prevent the glare from the headlights affecting the operator and the occupants of an approaching vehicle and of pedestrians, or for the purpose of giving better illumination to the surface immediately ahead of the vehicle.

A further object of the invention resides in the provision of tilting headlights which may be readily mounted on a motor vehicle with the complete tilting or operating means therefore, to provide for limited tilting of the headlights in unison.

To the accomplishment of these and related objects as may become apparent as the description proceeds, my invention resides in the construction, combination and arrangement of parts as shall be hereinafter more fully described, illustrated in the accompanying drawings and pointed out in the claim hereunto appended.

The invention will be best understood and can be more clearly described when reference is had to the drawings forming a part of this disclosure, wherein like characters indicate like parts throughout the several views.

In the drawings:—

Fig. 1 is a perspective view of the motor vehicle equipped with my tilting headlights.

Fig. 2 is a side elevation of the tilting headlights and the operating and controlling means therefore.

Fig. 3 is a detail section, showing clearly the mounting of the headlights for tilting on the motor vehicle.

Referring more in detail to the drawings it is to be noted that the tilting headlight includes an arcuate plate 6 for attachment on the forward mud guard 7 or some other appropriate part of the motor vehicle 8, truck or the like. A transverse horizontal bar 9 is also employed for connecting the pair of headlights 10 and which latter are mounted on the bar 9 as shown in the drawings. A hinge plate 11 is firmly secured on the arcuate plate 6 on each forward mud guard 7 and an angular bracket plate 12 has a turned back lower end 13 through which a hinge pin 14 is extended and which hinge pin 14 forms a part of or is firmly attached to the hinge plate 11.

The outwardly directed forward end 15 of the angular bracket plate 12 is secured to one face of the transverse horizontal bar 9 as shown clearly in Fig. 3. A spring 16 is connected by one end to a stationary part 17 of the motor vehicle 8, by an appropriate attaching means 18, while the opposite or forward end of the spring 16 is connected with the bracket 19 for mounting the headlights 10 on the transverse horizontal rod 9. This structure is naturally duplicated on the opposite side of the machine so that the headlights 10 are tilted in unison and also returned to normal position in unison, under the influence of the pair of springs 16.

The operating and controlling means for tilting the headlights 10 is shown clearly in Figures 2 and 3 and includes a downwardly and forwardly depending arm 20 carried by one of the attached brackets 19. A flexible operating member 21 is extended rearwardly from the arm 20 and connected with the operating and controlling lever 22 which is suitably mounted within the vehicle 8 within ready reach of the operator. The lever 22 is of conventional form and pivoted on a conventional segment 23 with which co-operates the automatic spring latch 24 carried on the lever 22 and released by the usual finger release 25. This may be readily understood by referring to the Figure 2 of the drawings.

As the construction of the device has thus been described in detail, brief reference is now had to its use and modus operandi: Whenever it is desired to tilt the headlights 10 so as to direct the rays of light down to the surface immediately in front of the vehicle 8, it is simply necessary for the operator to release the lever 22 and move it to its operative position, thus tilting the transverse horizontal bar 9 with the two headlights mounted thereon to the position in Figure 1 of the drawings, thus placing the spring 16 under tension. This tilting of the headlights 10 will eliminate the necessity of dimming the headlights 10 to prevent blinding and confusing of the operator and occupants of the approaching vehicle and of pedestrians. The tilting of the headlights 10 may also be employed for the purpose of giving better illumination to the surface of the road immediately ahead of the vehicle and this is of considerable advantage when travelling on rough or uneven roads. As soon as the lever 22 is released from its operative position, the spring 16 will act to return the transverse horizontal bar 9, the headlights 10 and the other operative parts to a normal position. It is also apparent from the drawings that the movement of the transverse horizontal bar and the headlights 10 forwardly and downwardly will be limited by engagement of the pair of bracket plates 12 with the plates 6 on which they are hinged. Movement of these parts in the reverse direction or to their return or normal position is also limited by the flexible operating member 21 and the lever 22, and the arm 20.

From the foregoing description taken in connection with the accompanying drawings, it will be manifest that a headlight is provided that will fulfill all the necessary requirements of such a device, but as many changes could be made in the above description and many apparently widely different embodiments of my invention constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

Tilting headlights for a motor vehicle including a pair of arcuate plates for firm attachment to the motor vehicle; hinge plates carried on the said arcuate plates; a pair of angular bracket plates; each bracket plate having a turned back lower end mounted on a hinge pin carried by one of said hinge plates; headlights; a transverse connecting bar extended between and carried on said bracket plates; said headlight being mounted on said bar; a forwardly depending arm carried by one of said headlights; means operable within the motor vehicle and connected to said arm to control tilting of the headlights in unison; and means connected with one of said headlights and with said motor vehicle to resiliently retain the headlights in normal position.

In testimony whereof I hereunto affix my signature.

DUNCAN McMILLAN. [L. S.]